(12) United States Patent
Hong

(10) Patent No.: US 11,533,189 B2
(45) Date of Patent: Dec. 20, 2022

(54) ELECTRONIC DEVICE AND METHOD FOR CONTROLLING EXTERNAL ELECTRONIC DEVICE

(71) Applicant: Samsung Electronics Co., Ltd., Suwon-si (KR)

(72) Inventor: Seunghwan Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 140 days.

(21) Appl. No.: 16/979,351

(22) PCT Filed: Apr. 26, 2019

(86) PCT No.: PCT/KR2019/005087
§ 371 (c)(1),
(2) Date: Sep. 9, 2020

(87) PCT Pub. No.: WO2019/209075
PCT Pub. Date: Oct. 31, 2019

(65) Prior Publication Data
US 2021/0006425 A1     Jan. 7, 2021

(30) Foreign Application Priority Data

Apr. 27, 2018  (KR) .................... 10-2018-0049281

(51) Int. Cl.
*B25J 9/16* (2006.01)
*G05D 1/02* (2020.01)
*H04L 12/28* (2006.01)

(52) U.S. Cl.
CPC ........ *H04L 12/2803* (2013.01); *B25J 9/1661* (2013.01); *B25J 9/1697* (2013.01);
(Continued)

(58) Field of Classification Search
CPC ............ H04L 12/2803; H04L 12/2827; H04L 2012/2841; H04L 2012/2849;
(Continued)

(56) References Cited

U.S. PATENT DOCUMENTS 8,583,282 B2   11/2013   Angle et al.
8,935,006 B2   1/2015    Vu et al.
(Continued)

FOREIGN PATENT DOCUMENTS

JP            6215087 B2    10/2017
KR   10-2014-0128021 A     11/2014
(Continued)

OTHER PUBLICATIONS

Extended European Search Report dated May 21, 2021, issued in a counterpart European Application No. 19793653.7-1016/3760394.

*Primary Examiner* — Abby Y Lin
*Assistant Examiner* — Dylan M Katz
(74) *Attorney, Agent, or Firm* — Jefferson IP Law, LLP

(57) ABSTRACT

An electronic device is provided. The electronic device includes a memory and a processor configured to move the electronic device, obtain an image and location of the external electronic device, identify the external electronic device based on the obtained image, transmit the plurality of control commands to the identified external electronic device, monitor a response of the external electronic device, store an identifier of a first control command set and the location of the external electronic device, wherein the first control command is based on the monitoring, and the first control command set includes the first control command that performs a pre-specified first operation, receive a first input, move the electronic device based on the received first input and the location, and transmit the first control command to (Continued)

the external electronic device based on the received first input and the identifier of the first control command set.

16 Claims, 11 Drawing Sheets

(52) U.S. Cl.
CPC ........... *G05D 1/0246* (2013.01); *B25J 9/1664* (2013.01); *H04L 2012/2841* (2013.01); *H04L 2012/2849* (2013.01)

(58) Field of Classification Search
CPC ...... B25J 9/1661; B25J 9/1697; B25J 9/0003; B25J 9/16; B25J 11/00; B25J 11/008; B25J 19/02; B25J 9/1664; B25J 9/1679; B25J 19/023; B25J 19/026; B25J 11/0005; B25J 11/0085; B25J 11/009; B25J 9/162; G05D 1/0246; G05D 1/0251
See application file for complete search history.

(56) References Cited

U.S. PATENT DOCUMENTS

| | | | |
|---|---|---|---|
| 9,375,847 B2 | 6/2016 | Angle et al. | |
| 9,436,186 B2 | 9/2016 | Oh et al. | |
| 9,446,510 B2 | 9/2016 | Vu et al. | |
| 9,452,525 B2 | 9/2016 | Ziegler et al. | |
| 9,796,078 B2 | 10/2017 | Angle et al. | |
| 9,874,873 B2 | 1/2018 | Angle et al. | |
| 2005/0137747 A1 | 6/2005 | Miro et al. | |
| 2014/0039680 A1* | 2/2014 | Angle | G16H 40/63 901/1 |
| 2014/0207281 A1* | 7/2014 | Angle | H04L 12/282 700/257 |
| 2015/0058740 A1* | 2/2015 | Asahi | G08C 17/02 715/740 |
| 2016/0282863 A1 | 9/2016 | Angle et al. | |
| 2017/0276501 A1 | 9/2017 | Wise et al. | |
| 2019/0387945 A1* | 12/2019 | Kim | A47L 9/2852 |
| 2020/0233388 A1* | 7/2020 | Pognant | H04L 63/102 |
| 2020/0246977 A1* | 8/2020 | Swietojanski | B25J 13/003 |

FOREIGN PATENT DOCUMENTS

| | | |
|---|---|---|
| KR | 10-2016-0113440 A | 9/2016 |
| KR | 10-2017-0071212 A | 6/2017 |
| KR | 10-2018-0013570 A | 2/2018 |

\* cited by examiner

ELECTRONIC DEVICE AND METHOD FOR CONTROLLING EXTERNAL ELECTRONIC DEVICE

TECHNICAL FIELD

Embodiments of the present disclosure relate to a technology of controlling an external electronic device by an electronic device.

BACKGROUND ART

For convenience of users, robots such as robot cleaners may be used in homes. Robots may not only perform cleaning but also receive a command from a user and perform an operation according to the received command.

For example, robots may move objects using an actuator or may control external electronic devices.

DISCLOSURE OF THE INVENTION

Technical Problem

According to the prior art, in order to control an external electronic device using a robot, a user is required to perform setting such as inputting information about the external electronic device to the robot.

Furthermore, when a robot is required to move in order to control an external electronic device, a user is required to register, in the robot, a location to which the robot has to move.

Various embodiments of the present invention provide a robot capable of learning a method of controlling an external electronic device to control the external electronic device in response to a user's command without an additional procedure of registration by the user.

Technical Solution

An electronic device according to an embodiment of the present invention includes: a housing; an actuator located in the housing; a camera located in the housing and exposed through a portion of the housing; a wireless communication circuit located in the housing; a microphone located in the housing and exposed through a portion of the housing; at least one processor operatively connected to the actuator, the camera, the wireless communication circuit, and the microphone; and a memory, which is operatively connected to the at least one processor and stores a plurality of control command sets, the plurality of control command sets including a plurality of control commands that cause an external electronic device to perform a pre-specified operation, wherein the memory stores instructions that, when executed, cause the processor to: control the actuator to move the electronic device; control the camera to obtain an image and location of the external electronic device; identify the external electronic device on the basis of the obtained image; transmit the plurality of control commands included in the plurality of control command sets to the identified external electronic device via the wireless communication circuit; monitor a response of the external electronic device to the plurality of control commands transmitted; store, in the memory, an identifier of a first control command set for the identified external electronic device and the location of the external electronic device, wherein the first control command is determined on the basis of the monitoring, and the first control command set is a control command set that includes the first control command that has caused the external electronic device to perform a pre-specified first operation among the plurality of control commands; receive, via the microphone or the wireless communication circuit, a first input for instructing the external electronic device to perform the first operation; control the actuator to move the electronic device to a location in which the first control command is able to be transmitted to the external electronic device on the basis of the received first input and the location of the external electronic device stored in the memory; and transmit the first control command to the external electronic device on the basis of the received first input and the identifier of the first control command set for the external electronic device stored in the memory.

A method for an electronic device to control an external electronic device according to an embodiment of the present invention includes: controlling an actuator to move the electronic device; controlling a camera to obtain an image and location of the external electronic device; identifying the external electronic device on the basis of the obtained image; transmitting a plurality of control commands included in a plurality of control command sets to the identified external electronic device; monitoring a response of the external electronic device to the plurality of control commands transmitted; storing an identifier of a first control command set for the identified external electronic device and the location of the external electronic device, wherein the first control command is determined on the basis of a result of the monitoring, and the first control command set is a control command set that includes the first control command that has caused the external electronic device to perform a pre-specified first operation among the plurality of control commands; receiving, via a microphone or a wireless communication circuit, a first input for instructing the external electronic device to perform the first operation; controlling the actuator to move the electronic device to a location in which the first control command is able to be transmitted to the external electronic device on the basis of the received first input and the stored location of the external electronic device; and transmitting the first control command to the external electronic device on the basis of the received first input and the identifier of the first control command set for the external electronic device stored in the memory.

A storage medium according to an embodiment of the present invention stores computer-readable commands that, when executed by a processor of an electronic device, cause the electronic device to perform: controlling an actuator to move the electronic device; controlling a camera to obtain an image and location of an external electronic device; identifying the external electronic device on the basis of the obtained image; transmitting a plurality of control commands included in a plurality of control command sets to the identified external electronic device; monitoring a response of the external electronic device to the plurality of control commands transmitted; storing an identifier of a first control command set for the identified external electronic device and the location of the external electronic device, wherein the first control command is determined on the basis of a result of the monitoring, and the first control command set is a control command set that includes the first control command that has caused the external electronic device to perform a pre-specified first operation among the plurality of control commands; receiving, via a microphone or a wireless communication circuit, a first input for instructing the external electronic device to perform the first operation; controlling the actuator to move the electronic device to a location in which the first control command is able to be transmitted to the external electronic device on the basis of the received first input and the stored location of the external electronic device; and transmitting the first control command to the external electronic device on the basis of the received first input and the identifier of the first control command set for the external electronic device stored in the memory.

Advantageous Effects

According to various embodiments of the present disclosure, a robot may learn a method of identifying an external electronic device and controlling the identified external electronic device. The robot may perform a control operation according to a user's command using the learned control method.

According to various embodiments of the present disclosure, a robot may learn a method of controlling an external electronic device using a conventional control method such as transmission of an infrared signal.

Besides, various effects may be provided that are directly or indirectly identified through the present disclosure.

BRIEF DESCRIPTION OF THE DRAWINGS

With respect to the description of the drawings, the same or similar reference signs may be used for the same or similar elements.

MODE FOR CARRYING OUT THE INVENTION

Hereinafter, various embodiments of the present invention will be described in detail with reference to the accompanying drawings. However, it should be understood that the present invention is not limited to specific embodiments, but rather includes various modifications, equivalents and/or alternatives of embodiments of the present invention.

Figure 1:
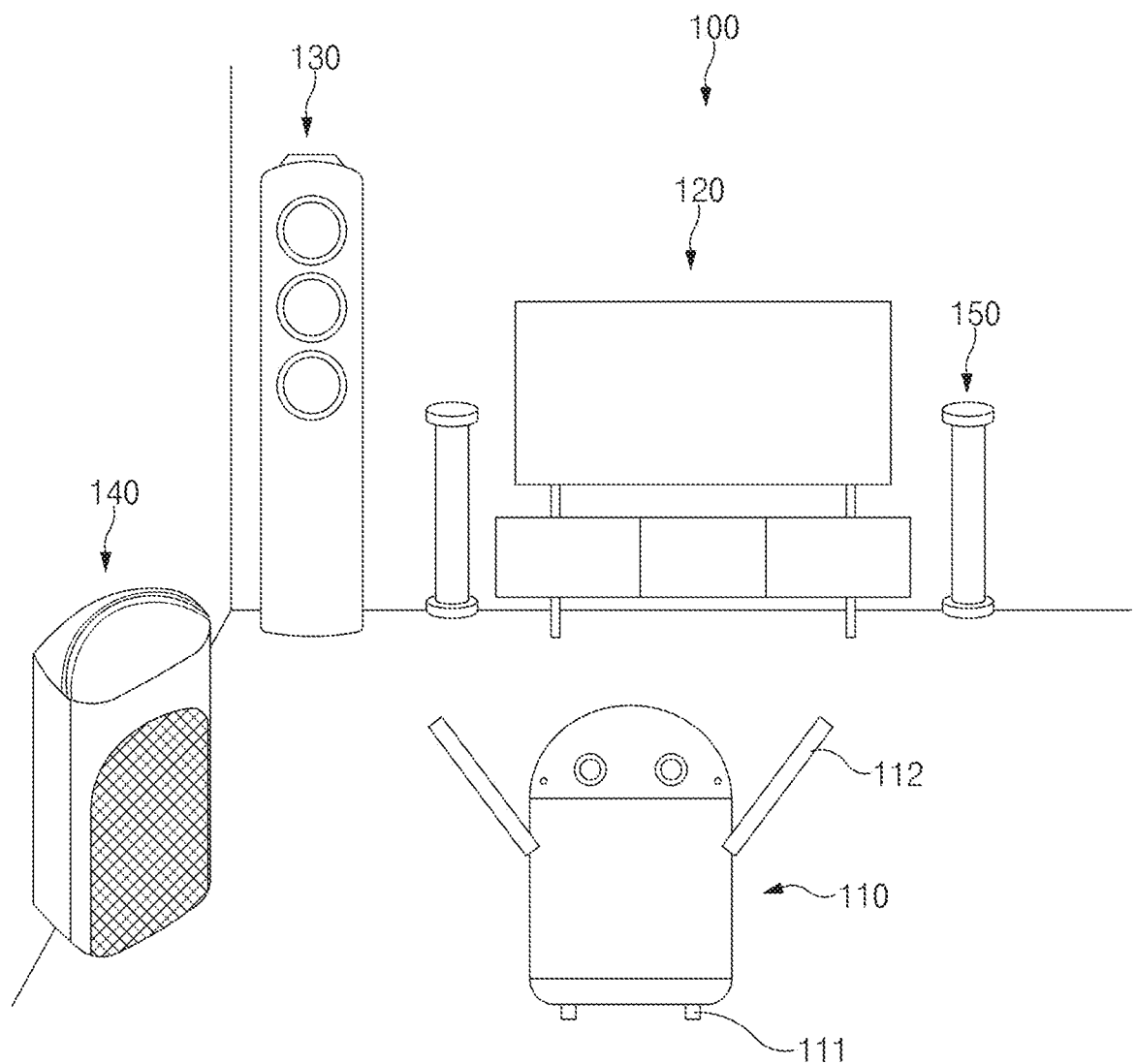
FIG. 1 illustrates an environment in which an electronic device according to various embodiments of the present invention controls an external electronic device.

FIG. 1 illustrates an environment in which an electronic device according to various embodiments of the present invention controls an external electronic device.

According to an embodiment, an electronic device 110 may be a robot. According to an embodiment, the electronic device 110 may include an actuator (e.g., the actuator 210 of FIG. 2), and a processor (e.g., the processor 270 of FIG. 2) of the electronic device 110 may move the electronic device 110 by controlling the actuator (e.g., the actuator 210 of FIG. 2).

External electronic devices 120 to 150 according to an embodiment may include at least one of a TV 120, an air conditioner 130, an air cleaner 140, or a speaker 150. According to an embodiment, the external electronic devices 120 to 150 may receive a control command.

According to an embodiment, the external electronic devices 120 to 150 may include a wireless signal receiving module, and may receive a wireless signal (e.g., infrared signal) including a control command via the wireless signal receiving module.

According to an embodiment, the external electronic devices 120 to 150 may include at least one button (not shown) (e.g., a touch button or physical button) for receiving a touch input. For example, the external electronic devices 120 to 150 may include a power on button, a power off button, a channel change button, a volume change button, a temperature adjustment button, an airflow volume adjustment button, or the like. According to an embodiment, the external electronic devices may receive a control command via a button (not shown).

Figure 2:
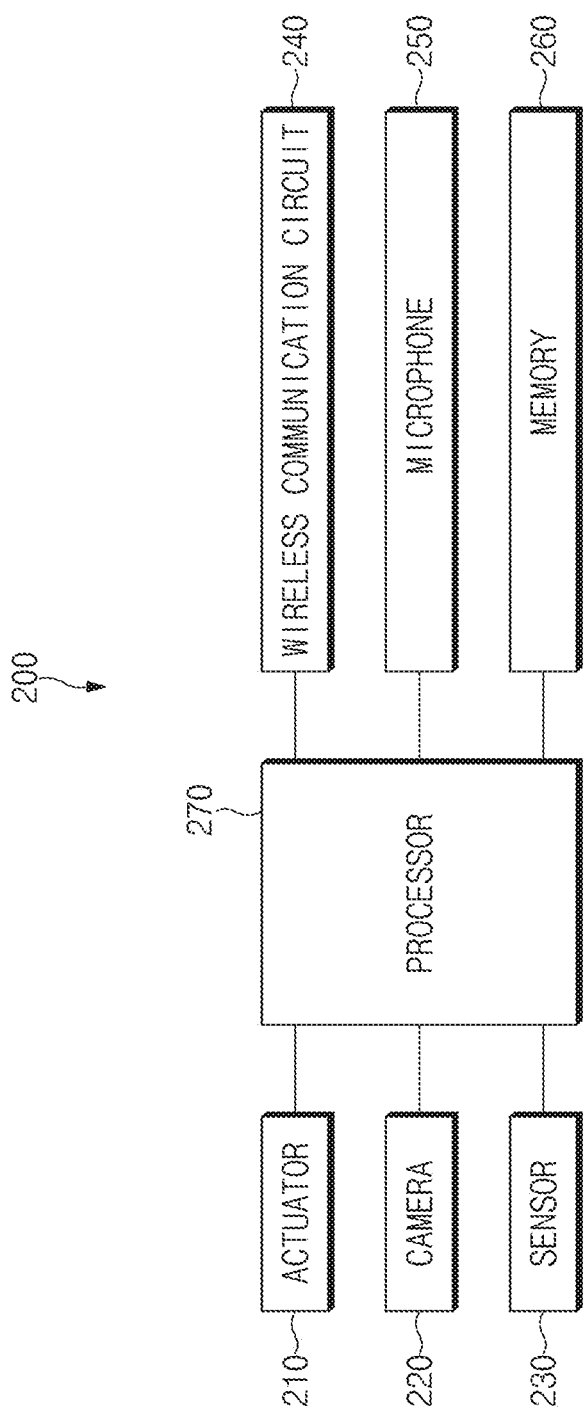
FIG. 2 is a block diagram illustrating an electronic device according to various embodiments of the present invention.

FIG. 2 is a block diagram illustrating an electronic device according to various embodiments of the present invention.

Referring to FIG. 2, an electronic device (e.g., the electronic device 110 of FIG. 1) may include an actuator 210, a camera 220, a sensor 230, a wireless communication circuit 240, a microphone 250, a memory 260, and a processor 270.

The actuator 210 may convert an electric signal into a physical motion. According to an embodiment, the electronic device (e.g., the electronic device 110 of FIG. 1) may include a wheel (e.g., the wheel 111 of the electronic device 110 of FIG. 1), and the actuator 210 may be controlled by the processor 270 to move the electronic device by rotating the wheel (e.g., the wheel 111 of the electronic device 110).

According to an embodiment, the electronic device (e.g., the electronic device 110 of FIG. 1) may include a robot arm (e.g., the robot arm 112 of the electronic device 110 of FIG. 1) which touches a button (not shown) of an external electronic device (e.g., the external electronic devices 120 to 150 of FIG. 1). According to an embodiment, the actuator 210 may be controlled by the processor 270 to extend or move the robot arm (e.g., the robot arm 112 of the electronic device 110 of FIG. 1).

The camera 220 may acquire an external image. According to an embodiment, the electronic device (e.g., the electronic device 110 of FIG. 1) may include a plurality of cameras 220.

The sensor 230 may detect a surrounding environment of the electronic device (e.g., the electronic device 110). According to an embodiment, the electronic device (e.g., the electronic device 110 of FIG. 1) may include at least one of a simultaneous localization and mapping (SLAM) sensor (not shown) or a temperature sensor (not shown).

According to an embodiment, the SLAM sensor (not shown) may obtain three-dimensional information about a surrounding object of the electronic device (e.g., the electronic device 110 of FIG. 1).

According to an embodiment, the temperature sensor (not shown) may measure a surrounding temperature of the electronic device (e.g., the electronic device 110 of FIG. 1).

The wireless communication circuit 240 may support wireless communication between the electronic device (e.g., the electronic device 110 of FIG. 1) and an external electronic device (e.g., the external electronic devices 120 to 150 of FIG. 1, a mobile electronic device, an external server, a control target electronic device, or the like).

According to an embodiment, the wireless communication circuit 240 may include at least one of a cellular communication module (not shown), a Wi-Fi module (not shown), or a Bluetooth module (not shown). The wireless communication circuit 240 may transmit/receive data to/from an external electronic device (e.g., the external electronic devices 120 to 150 of FIG. 1) using the above modules.

Figure 5A:
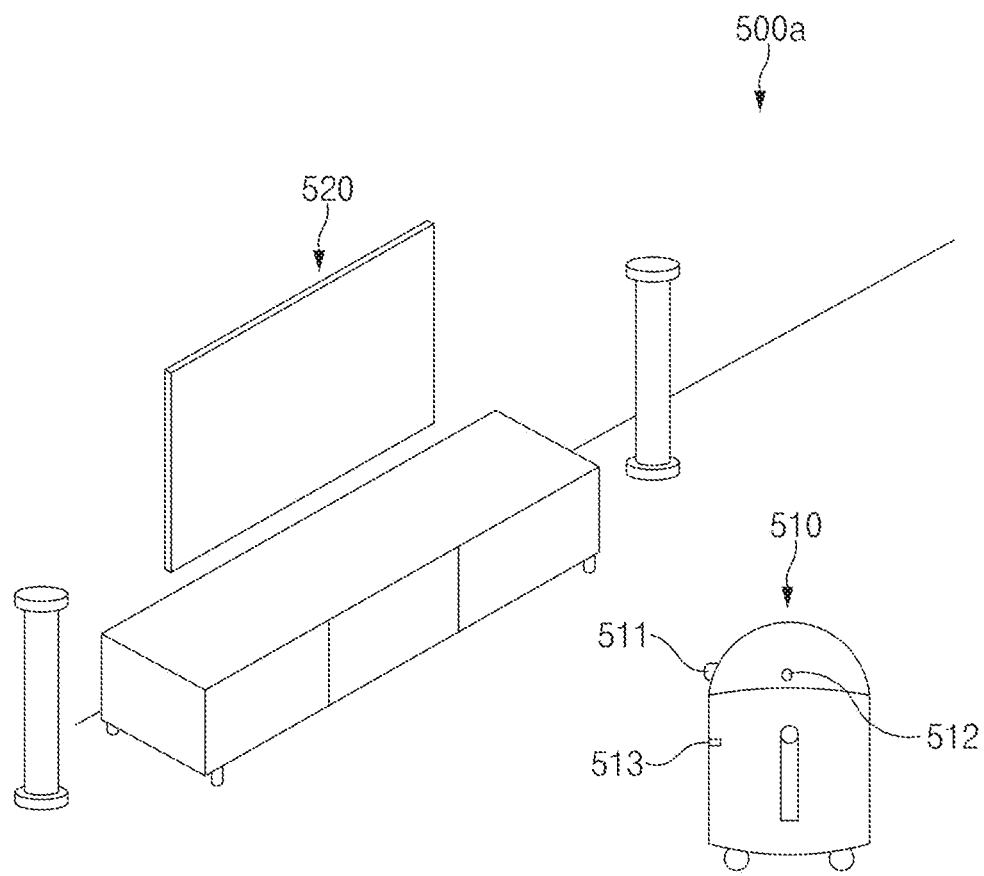
FIG. 5A is a diagram illustrating that an electronic device according to various embodiments of the present invention identifies a TV.
Figure 5B:
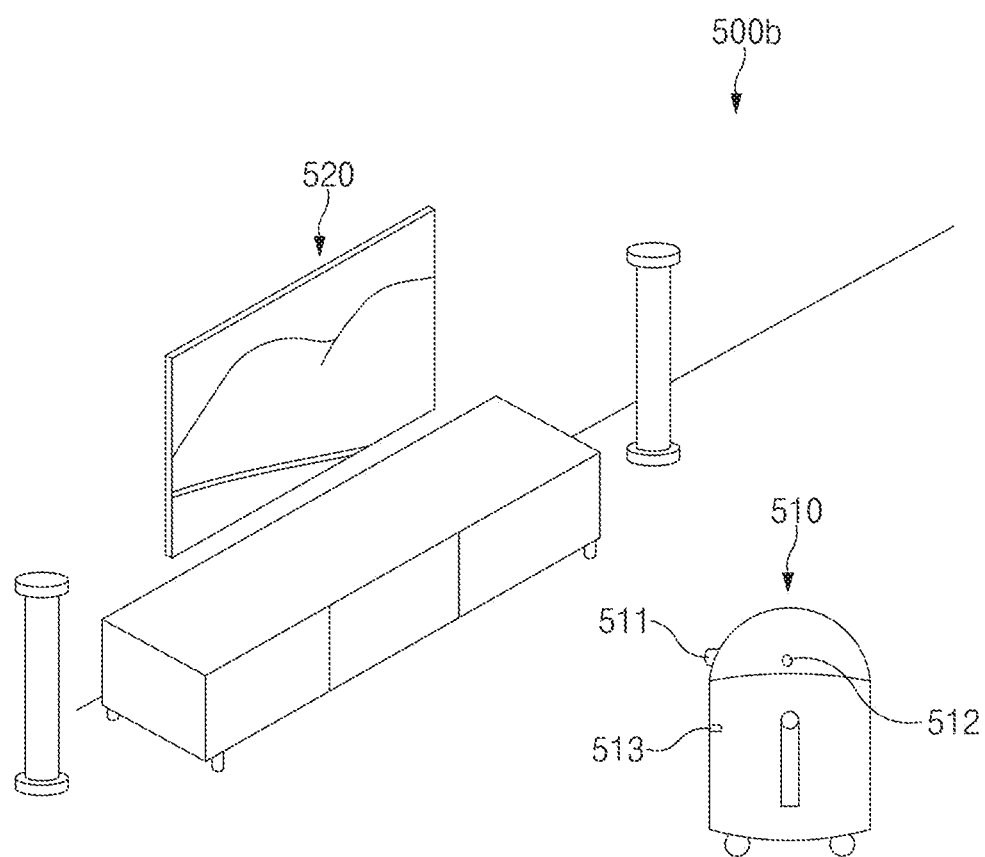
FIG. 5B is a diagram illustrating that power of a TV is turned on by a plurality of control commands transmitted from an electronic device according to various embodiments of the present invention to the TV.

According to an embodiment, the wireless communication circuit 240 may include an infrared data association (IrDA) module (e.g., the infrared signal transmitting module 513 of FIGS. 5A and 5B). According to an embodiment, the wireless communication circuit 240 may transmit an infrared signal including a control command to an external electronic device (e.g., the external electronic devices 120 to 150 of FIG. 1) using the IrDA module 513.

The microphone 250 may obtain a sound signal, and may convert the obtained sound signal into an electric signal. According to an embodiment, the processor 270 may obtain, via the microphone 250, a user speech input for transmitting a control command to an external electronic device (e.g., the external electronic devices 120 to 150 of FIG. 1).

The memory 260 may store a plurality of control command sets, information about a pre-specified space, and instructions. According to an embodiment, the control command set may include a plurality of control commands for controlling an external electronic device (e.g., the external electronic devices 120 to 150). Each of the plurality of control command sets may cause an external electronic device (e.g., the external electronic devices 120 to 150 of FIG. 1) to perform a pre-specified operation.

According to an embodiment, each of the plurality of control command sets may correspond to the type of an external electronic device (e.g., the external electronic devices 120 to 150). For example, a first control command set among the plurality of control command sets may include a plurality of control commands for controlling a TV (e.g., the TV 120 of FIG. 1) having a brand name A. For example, the control command set may include a first control command for turning on the TV (e.g., the TV 120 of FIG. 1) having the brand name A, a second control command for increasing a sound volume of the TV (e.g., the TV 120 of FIG. 1) having the brand name A, and the like.

According to an embodiment, the information about a pre-specified space may include a name for each section and location coordinate for each section of a space in which the electronic device (e.g., the electronic device 110 of FIG. 1) is used.

The processor 270 may control overall operation of the electronic device (e.g., the electronic device 110 of FIG. 1) by executing the instructions stored in the memory 260. Specific operation of the processor 270 is described below.

Figure 3:
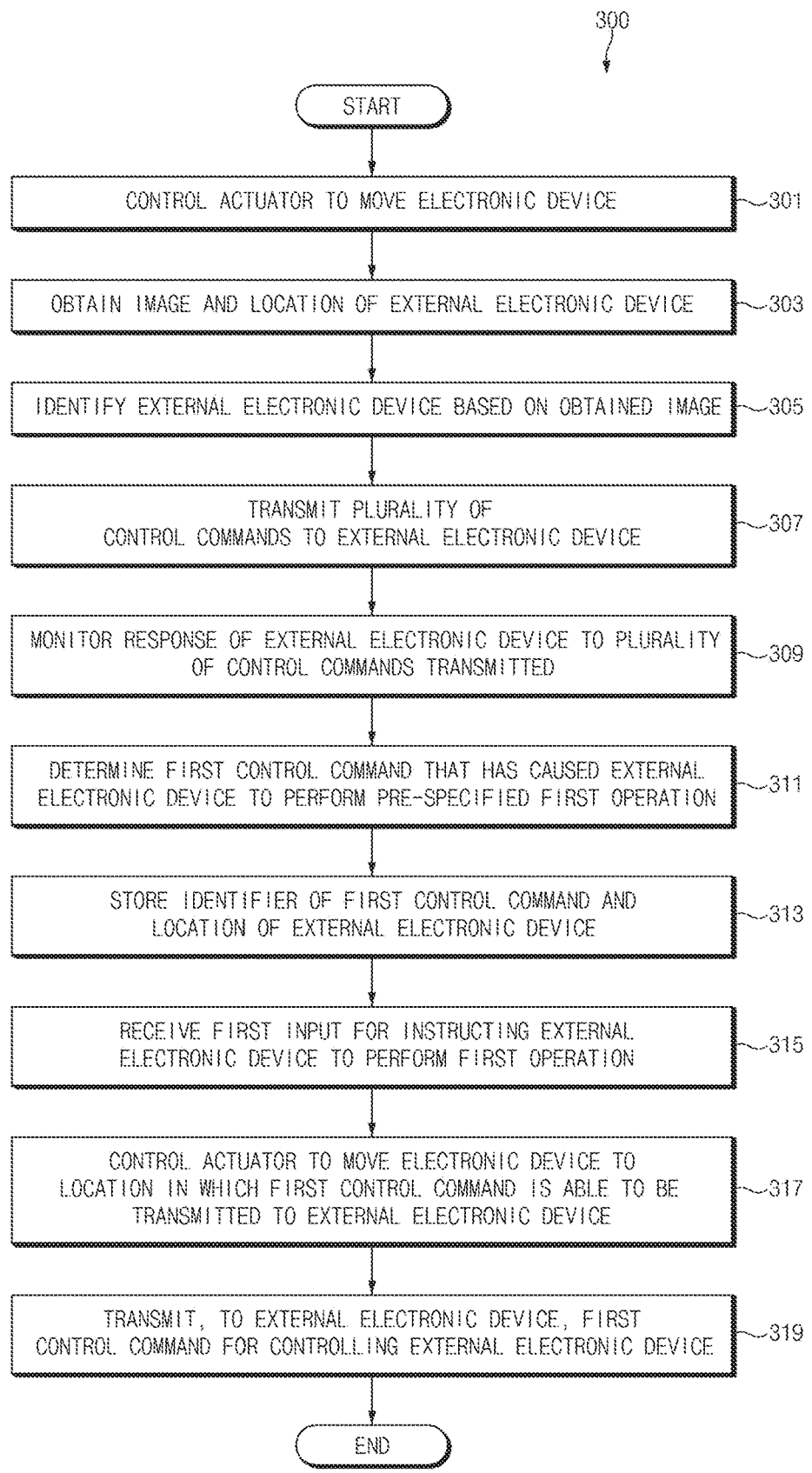
FIG. 3 is a flowchart illustrating a method for an electronic device according to various embodiments of the present invention to control an external electronic device.

FIG. 3 is a flowchart illustrating a method for an electronic device according to various embodiments of the present invention to control an external electronic device.

Hereinafter, it is assumed that the electronic device 200 of FIG. 2 (e.g., the electronic device 110 of FIG. 1) executes the processes of FIGS. 3 and 4. Operations described as being performed by the electronic device 200 may be implemented as instructions (commands) that may be performed (or executed) by a processor (e.g., the processor 270 of FIG. 2) of the electronic device 200. The instructions may be stored in, for example, a computer recording medium or the memory 260 of the electronic device 200 illustrated in FIG. 2.

In operation 301, the processor 270 may control the actuator 210 to move the electronic device 200.

According to an embodiment, the processor 270 may control the actuator 210 to move the electronic device 200 within a pre-specified space stored in the memory 260.

In operation 303, the processor 270 may control the camera 220 to obtain an image and location of an external electronic device (e.g., the external electronic devices 120 to 150 of FIG. 1).

According to an embodiment, the processor 270 may control the camera 220 to obtain the image and location of the external electronic devices 120 to 150 while the electronic device 200 is moving.

According to an embodiment, the processor 270 may obtain the location of the external electronic devices 120 to 150 using the obtained image. According to an embodiment, the processor 270 may obtain the location of the external electronic devices 120 to 150 using the location coordinate for each section stored in the memory 260. For example, when the location coordinates of a pre-specified point in a section A are (50, 100), and the external electronic devices 120 to 150 are spaced 50 apart in a y direction from the pre-specified point, the processor 270 may determine the location coordinates of the external electronic devices 120 to 150 as (50, 150).

According to an embodiment, the processor 270 may further obtain three-dimensional information about a surrounding object of the electronic device 200 through a SLAM sensor (not shown).

In operation 305, the processor 270 may identify the external electronic devices 120 to 150 on the basis of the obtained image.

According to an embodiment, the processor 270 may identify the external electronic devices 120 to 150 using the image obtained through the camera 220 and the three-dimensional information obtained through the SLAM sensor (not shown).

According to an embodiment, the processor 270 may identify the type of the external electronic devices 120 to 150. For example, the processor 270 may identify that the type of the external electronic devices 120 to 150 is a TV (e.g., the TV 120 of FIG. 1) on the basis of the obtained image.

In operation 307, the processor 270 may transmit a plurality of control commands to the identified external electronic devices 120 to 150 via the wireless communication circuit 240.

According to an embodiment, the processor 270 may transmit the plurality of control commands to the identified external electronic devices 120 to 150 using an infrared (IR) signal. According to various embodiments, the processor 270 may also transmit the plurality of control commands to the external electronic devices 120 to 150 using Bluetooth communication.

According to an embodiment, the processor 270 may transmit the plurality of control commands included in the plurality of control command sets to the external electronic devices 120 to 150.

According to an embodiment, each of the plurality of control command sets may correspond to the type of the external electronic devices 120 to 150. For example, among the plurality of control command sets, a first control command set may be a control command for controlling a first-type TV (e.g., the TV 120 of FIG. 1), a second control command set may be a control command for controlling a second-type TV (e.g., the TV 120 of FIG. 1), and a third control command set may be a control command for controlling a first-type air conditioner (e.g., the air conditioner of FIG. 1).

According to an embodiment, the plurality of control commands transmitted in operation 307 may be control commands that cause execution of the same operation among the control commands included in each of the plurality of control command sets. For example, the plurality of transmitted control commands may be control commands for instructing the external electronic devices 120 to 150 to turn on power.

According to an embodiment, the processor 270 may transmit a plurality of control commands corresponding to the type of the identified external electronic devices 120 to 150. For example, when the processor 270 has identified the external electronic devices 120 to 150 as the TV 120, the processor 270 may transmit, to the external electronic devices 120 to 150, control commands included in a plurality of control command sets for controlling the TV 120 among a plurality of control command sets.

In operation 309, the processor 270 may monitor a response of the identified external electronic devices 120 to 150 to the plurality of transmitted control commands.

According to an embodiment, the processor 270 may monitor the response of the identified external electronic devices 120 to 150 through at least one of the camera 220 or the microphone 250. According to an embodiment, the external electronic devices 120 to 150 may be the TV 120, and the transmitted control command may be a power-on command. In an embodiment, the processor 270 may monitor operation of the TV 120 on the basis of an image of the TV 120 captured through the camera 220 or a sound of the TV 120 obtained through the microphone 250.

According to an embodiment, the processor 270 may monitor the response of the identified external electronic devices 120 to 150 through a temperature sensor (not shown). According to an embodiment, the external electronic devices 120 to 150 may be the air conditioner 130, and the transmitted control command may be a temperature adjustment command. In an embodiment, the processor 270 may monitor operation of the air conditioner 130 by measuring temperature through the temperature sensor (not shown).

In operation 311, the processor 270 may determine a first control command that has caused the identified external electronic devices 120 to 150 to perform a pre-specified first operation among a plurality of control commands.

According to an embodiment, the processor 270 may determine the first control command on the basis of the monitoring of the response of the identified external electronic devices 120 to 150 in operation 309.

According to an embodiment, the plurality of control commands transmitted to the identified external electronic devices 120 to 150 in operation 307 may instruct the identified external electronic devices 120 to 150 to perform a power-on operation. According to an embodiment, in operation 307, the processor 270 may transmit a control command A, a control command B, and a control command C to the identified external electronic devices 120 to 150. The processor 270 may determine that the control command B has caused power-on of the identified external electronic devices 120 to 150 on the basis of the monitoring performed in operation 309. Accordingly, the processor 270 may determine the control command B as the first control command.

In operation 313, the processor 270 may store, in the memory 260, an identifier of the first control command set for the identified external electronic devices 120 to 150 and the location of the identified external electronic devices 120 to 150.

According to an embodiment, the first control command set may be a control command set including the first control command determined in operation 311.

According to an embodiment, the identifier of the first control command set may be a character or number for identifying the first control command set. For example, the identifier of the first control command set may be 'samsung1'. According to an embodiment, the identifier of the first control command set may be an identifier for identifying a control command set in which the first control command is included.

According to an embodiment, the processor 270 may store the location coordinates of the identified external electronic devices 120 to 150.

According to an embodiment, the processor 270 may further store the type of the identified external electronic devices 120 to 150. For example, when the external electronic devices 120 to 150 identified in operation 305 are the TV 120, the processor 270 may store the TV 120 as the type of the external electronic devices 120 to 150.

According to an embodiment, the processor 270 may generate a mapping table in which the identifier of the first control command set and the location of the identified external electronic devices 120 to 150 are mapped to the identified external electronic devices, and may store the generated mapping table in the memory 260. For example, the mapping table generated by the processor 270 may include 'samsung1' as a mapped first identifier, (100,200) as the location, and the TV (120) as the type with regard to the identified external electronic devices 120 to 150.

In operation 315, the processor 270 may receive, via the microphone 250 or the wireless communication circuit 240, a first input for instructing the external electronic devices 120 to 150 to perform a first operation.

According to an embodiment, the first input may include information about the location of the external electronic devices 120 to 150.

According to an embodiment, the processor 270 may receive a user speech input via the microphone 250. For example, the user speech input may read "turn on the TV in the living room".

According to an embodiment, when the processor 270 receives the user speech input via the microphone 250, the processor 270 may perform natural language processing on the user speech input to obtain the location of the external electronic devices 120 to 150 and a control command included in the user speech input. According to an embodiment, the processor 270 may transmit the received user speech input to an external server (not shown), and may receive, from the external server (not shown), the location of the external electronic devices 120 to 150 and the control command included in the user speech input.

According to an embodiment, the processor 270 may receive the first input via the wireless communication circuit 240 (e.g., a Wi-Fi module, a Bluetooth module, a cellular communication module, or the like). For example, the first input may be an input transmitted from an application of a mobile electronic device (not shown).

In operation 317, the processor 270 may control, on the basis of the received first input and the location of the external electronic devices 120 to 150 stored in the memory 260, the actuator 210 to move the electronic device (e.g., the electronic device 110 of FIG. 1) to a location in which the electronic device is able to transmit the first control command to the external electronic devices 120 to 150.

According to an embodiment, the first input may read "turn on the TV in the living room", and location coordinates stored in the memory 260 and mapped to the TV 120 located in the living room may be (100, 200). In an embodiment, the processor 270 may control, on the basis of the first input, the actuator 210 to move the electronic device 110 to a location in which a control command is able to be transmitted to the TV 120 located in the living room. The location in which the control command is able to be transmitted to the TV 120 located in the living room may be, for example, a location within 10 m from the location coordinates (100, 200). In an embodiment, the processor 270 may control the actuator 210 to move the electronic device 110 to a location within 10 m from the location coordinates (100, 200).

In operation 319, the processor 270 may transmit the first control command to the external electronic devices 120 to 150 on the basis of the received first input and the identifier stored in the memory 260.

According to an embodiment, the first input may read "turn on the TV 120 in the living room", and the identifier of the control command set stored in the memory 260 and mapped to the TV 120 located in the living room may be 'samsung1'. In an embodiment, the processor 270 may transmit, to the TV 120, a control command for turning on the TV 120, which is included in a control command set corresponding to the identifier 'samsung1' among the plurality of control command sets stored in the memory 260.

According to various embodiments, the processor 270 may receive, via the microphone 250 or the wireless communication circuit 240, a second input for instructing the external electronic devices 120 to 150 to perform a second operation different from the first operation.

The processor 270 may control, on the basis of the received second input and the location of the external electronic devices 120 to 150 stored in the memory 260, the actuator 210 to move the electronic device 110 to a location in which the electronic device 110 is able to transmit the second control command to the external electronic devices 120 to 150.

According to an embodiment, the second input may read "increase the volume of the TV in the living room", and the location coordinates stored in the memory 260 and mapped to the TV 120 located in the living room may be (100, 200). In an embodiment, the processor 270 may control, on the basis of the second input, the actuator 210 to move the electronic device 110 to a location in which the second control command is able to be transmitted to the TV 120 located in the living room. In an embodiment, when the electronic device 110 is already positioned in the location in which the second control command is able to be transmitted to the TV 120, the processor 270 may not move the electronic device 110.

The processor 270 may transmit the second control command to the external electronic devices 120 to 150 on the basis of the received second input and the identifier stored in the memory 260.

According to an embodiment, the second input may read "increase the volume of the TV in the living room", and the identifier of the control command set stored in the memory 260 and mapped to the TV 120 located in the living room may be 'samsung1'. In an embodiment, the processor 270 may transmit, to the TV, the second control command for increasing the volume of the TV, which is included in a control command set corresponding to the identifier 'samsung1' among the plurality of control command sets stored in the memory 260.

Figure 4:
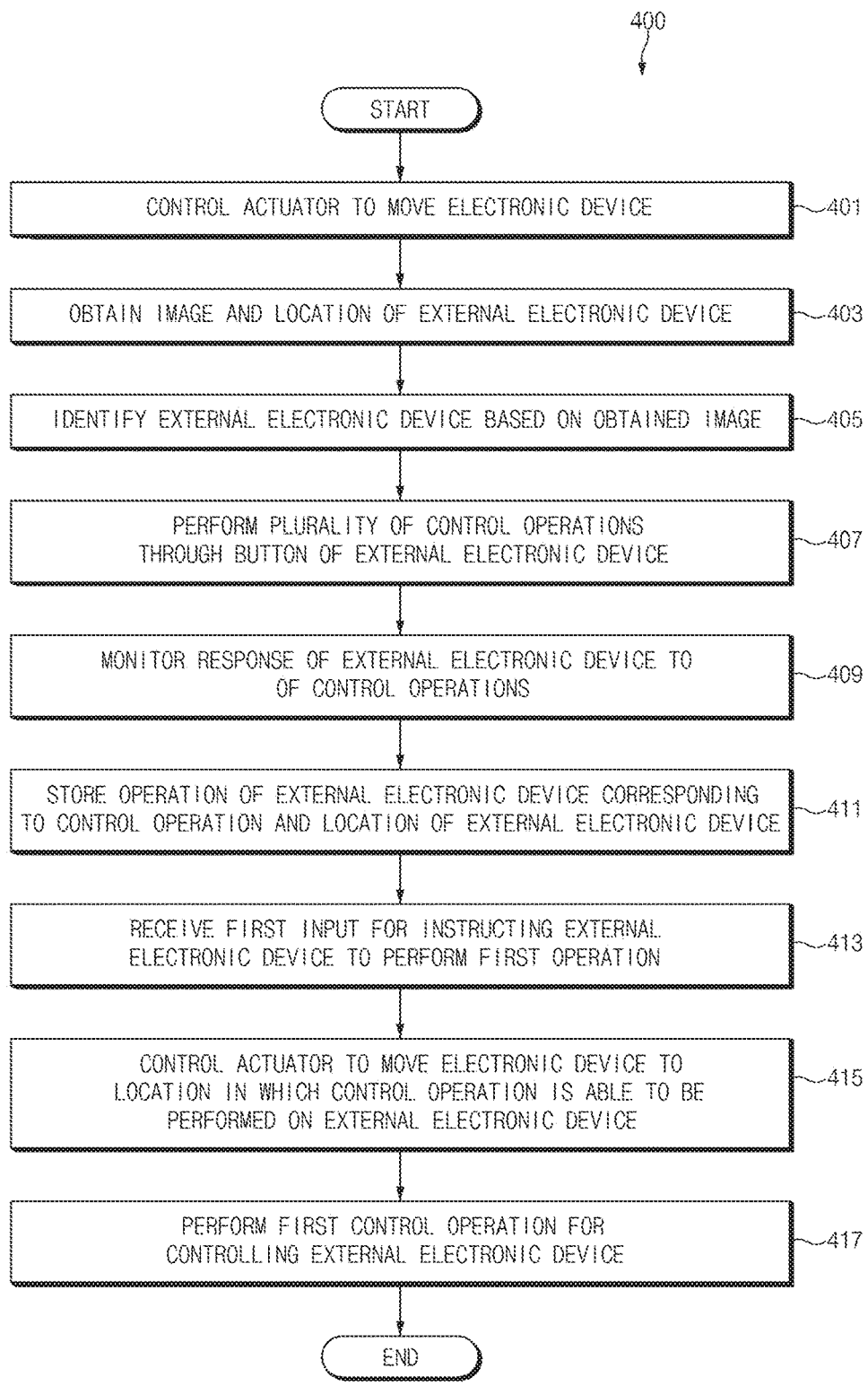
FIG. 4 is a flowchart illustrating a method for an electronic device according to various embodiments of the present invention to control an external electronic device.

FIG. 4 is a flowchart illustrating a method for an electronic device according to various embodiments of the present invention to control an external electronic device.

In operation 401, the processor 270 may control the actuator 210 to move the electronic device 110.

According to an embodiment, the processor 270 may control the actuator 210 to move the electronic device 110 within a pre-specified space stored in the memory 260.

In operation 403, the processor 270 may control the camera 220 to obtain an image and location of the external electronic devices 120 to 150.

According to an embodiment, the processor 270 may control the camera 220 to obtain the image and location of the external electronic devices 120 to 150 while the electronic device 110 is moving.

According to an embodiment, the processor 270 may obtain the location of the external electronic devices 120 to 150 using the obtained image. According to an embodiment, the processor 270 may obtain the location of the external electronic devices 120 to 150 using the location coordinate for each section stored in the memory 260. For example, when the location coordinates of a pre-specified point in a section A are (50, 100), and the external electronic devices 120 to 150 are spaced 50 apart in a y direction from the pre-specified point, the processor 270 may determine the location coordinates of the external electronic devices 120 to 150 as (50, 150).

According to an embodiment, the processor 270 may further obtain three-dimensional information about a surrounding object of the electronic device 110 through a SLAM sensor (not shown).

In operation 405, the processor 270 may identify the external electronic devices 120 to 150 on the basis of the obtained image.

According to an embodiment, the processor 270 may identify the external electronic devices 120 to 150 using the image obtained through the camera 220 and the three-dimensional information obtained through the SLAM sensor (not shown).

According to an embodiment, the processor 270 may identify the type of the external electronic devices 120 to 150. For example, the processor 270 may identify that the type of the external electronic devices 120 to 150 is a speaker (e.g., the speaker 150 of FIG. 1) on the basis of the obtained image.

In operation 407, the processor 270 may perform a plurality of control operations through a button (not shown) included in the external electronic devices 120 to 150.

According to an embodiment, to perform the plurality of control operations, the processor 270 may control the actuator 210 so that a robot arm (e.g., the robot arm 112 of the electronic device 110 of FIG. 1) of the electronic device 110 sequentially presses a plurality of buttons included in the external electronic devices 120 to 150.

According to an embodiment, in the case where the buttons of the external electronic devices 120 to 150 are touch buttons, the processor 270 may control the actuator 210 so that the robot arm (e.g., the robot arm 112 of the electronic device 110 of FIG. 1) of the electronic device 110 sequentially touches the plurality of buttons included in the external electronic devices 120 to 150.

In operation 409, the processor 270 may monitor a response of the external electronic devices 120 to 150 to the plurality of performed control operations.

According to an embodiment, the processor 270 may monitor the response of the external electronic devices 120 to 150 through at least one of the camera 220 or the microphone 250. According to an embodiment, the external electronic devices 120 to 150 may be the speaker 150, wherein the speaker 150 may include a power button (not shown), a volume up button (not shown), and a volume down button (not shown). In operation 407 according to an embodiment, the processor 270 may control the actuator 210 to perform a control operation for allowing the robot arm (e.g., the robot arm 112 of the electronic device 110 of FIG. 1) to press a first button (e.g., power button), a control operation for allowing the robot arm to press a second button (e.g., volume up button), and a control operation for allowing the robot arm to press a third button (e.g., volume down button). In operation 409 according to an embodiment, the processor 270 may monitor power on/off of the speaker 150, a volume increase of the speaker 150, and a volume decrease of the speaker 150 on the basis of a sound signal of the speaker 150 obtained through the microphone 250.

In operation 411, the processor 270 may store, in the memory 260, the location of the external electronic devices 120 to 150 and information about operation of the external electronic devices 120 to 150 corresponding to the plurality of control operations.

According to an embodiment, the processor 270 may determine, on the basis of the monitoring performed in operation 409, an operation of the external electronic devices 120 to 150 according to a control operation. For example, when a sound signal is output from the speaker 150 in response to the control operation of pressing the first button, the processor 270 may determine an operation of the speaker 150 according to the control operation of pressing the first button as a power-on operation.

According to an embodiment, the processor 270 may store, in the memory 260, information about a power on/off operation of the speaker 150 according to the control operation of pressing the first button, information about a volume increase operation of the speaker 150 according to the control operation of pressing the second button, and information about a volume decrease operation of the speaker 150 according to the control operation of pressing the third button.

According to an embodiment, the processor 270 may store the location coordinates of the external electronic devices 120 to 150.

According to an embodiment, the processor 270 may further store the type of the identified external electronic devices 120 to 150. For example, when the external electronic devices 120 to 150 identified in operation 405 are the speaker 150, the processor 270 may further store the speaker 150 as the type of the external speaker devices 120 to 150.

According to an embodiment, the processor 270 may generate a mapping table in which the operation of the external electronic devices 120 to 150 according to a control operation and the location of the external electronic devices 120 to 150 are mapped to the identified external electronic devices 120 to 150, and may store the generated mapping table in the memory 260.

In operation 413, the processor 270 may receive, via the microphone 250 or the wireless communication circuit 240, a first input for instructing the external electronic devices 120 to 150 to perform a first operation.

According to an embodiment, the first input may include information about the location of the external electronic devices 120 to 150.

According to an embodiment, the processor 270 may receive a user speech input via the microphone 250. For example, the user speech input may read "turn on the speaker in the living room".

According to an embodiment, when the processor 270 receives the user speech input via the microphone 250, the processor 270 may perform natural language processing on the user speech input to obtain the location of the external electronic devices 120 to 150 and a control command included in the user speech input. According to an embodiment, the processor 270 may transmit the received user speech input to an external server (not shown), and may receive, from the external server (not shown), the location of the external electronic devices 120 to 150 and the control command included in the user speech input.

According to an embodiment, the processor 270 may receive the first input via the wireless communication circuit 240 (e.g., a Wi-Fi module, a Bluetooth module, a cellular communication module, or the like). For example, the first input may be an input transmitted from an application of a mobile electronic device (not shown).

In operation 415, the processor 270 may control, on the basis of the received first input and the location of the external electronic devices 120 to 150 stored in the memory 260, the actuator 210 to move the electronic device 110 to a location in which the electronic device 110 is able to perform a control operation on the external electronic devices 120 to 150.

According to an embodiment, the first input may read "turn on the speaker in the living room", and location coordinates stored in the memory 260 and mapped to the speaker 150 located in the living room may be (200, 200). In an embodiment, the processor 270 may control, on the basis of the first input, the actuator 210 to move the electronic device 110 to a location in which a control operation is able to be performed on the speaker 150 located in the living room. The location in which the control operation is able to be performed on the speaker 150 located in the living room may be, for example, a location within 1 m from the location coordinates (200, 200) of the speaker 150 located in the living room. In an embodiment, the processor 270 may control the actuator 210 to move the electronic device 110 to a location within 1 m from the location coordinates (100, 200).

In operation 417, the processor 270 may perform a first control operation on the basis of the received first input and operation of the external electronic devices 120 to 150 according to a control operation stored in the memory 260.

According to an embodiment, the first input may read "turn on the speaker in the living room", and the control operation corresponding to an operation of turning on power of the speaker 150 and stored in the memory 260 may be an operation of pressing the first button of the speaker 150. In an embodiment, the processor 270 may control the actuator 210 to perform the operation of pressing the first button for turning on the power of the speaker.

Hereinafter, an embodiment in which the above-mentioned electronic device (e.g., the electronic device 110 of FIG. 1) controls an external electronic device (e.g., the external electronic devices 120 to 150 of FIG. 1) will be described with reference to the drawings.

Figure 5C:
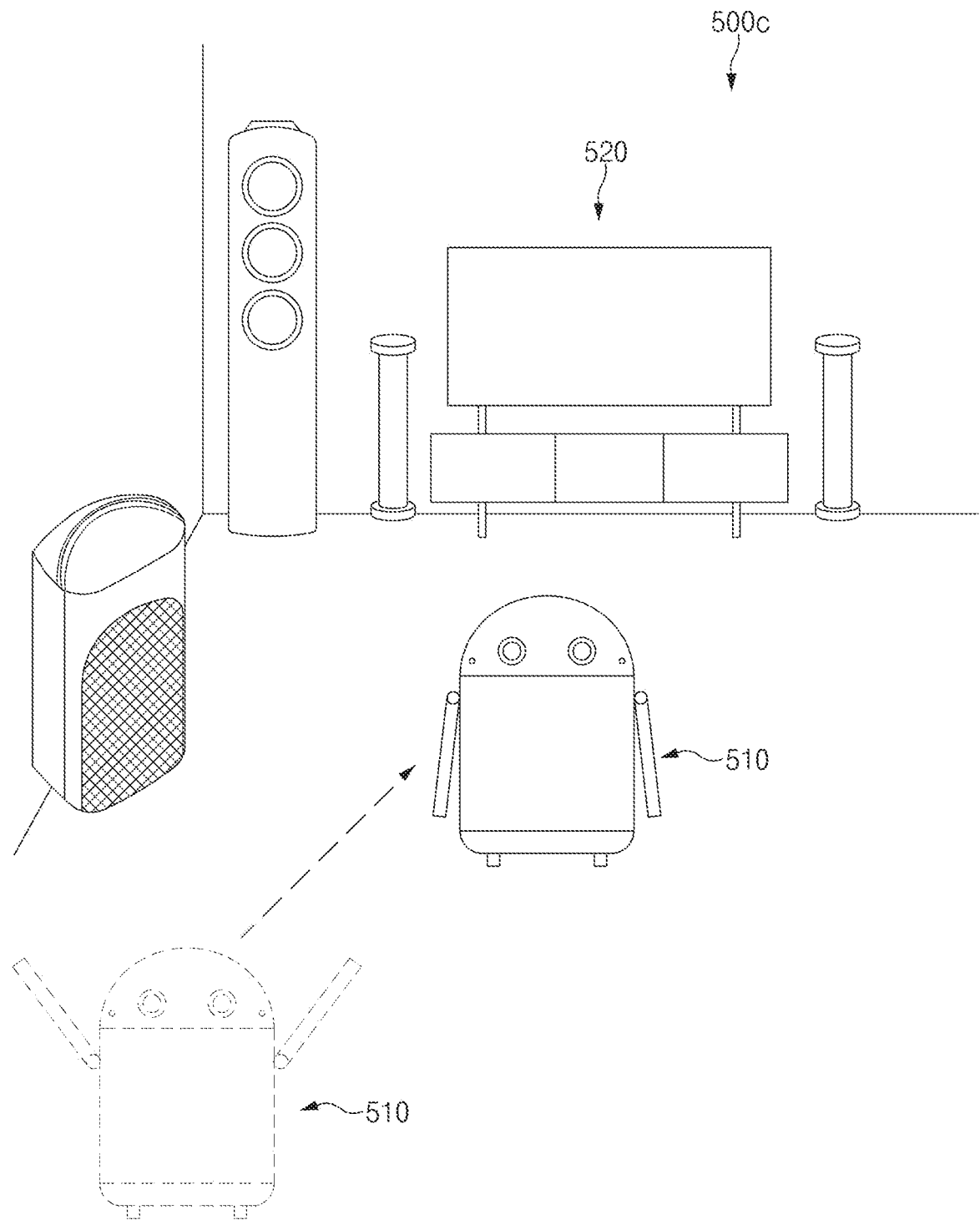
FIG. 5C is a diagram illustrating that an electronic device according to various embodiments of the present invention moves to a location in which the electronic device is able to transmit a control command to a TV.
Figure 5D:
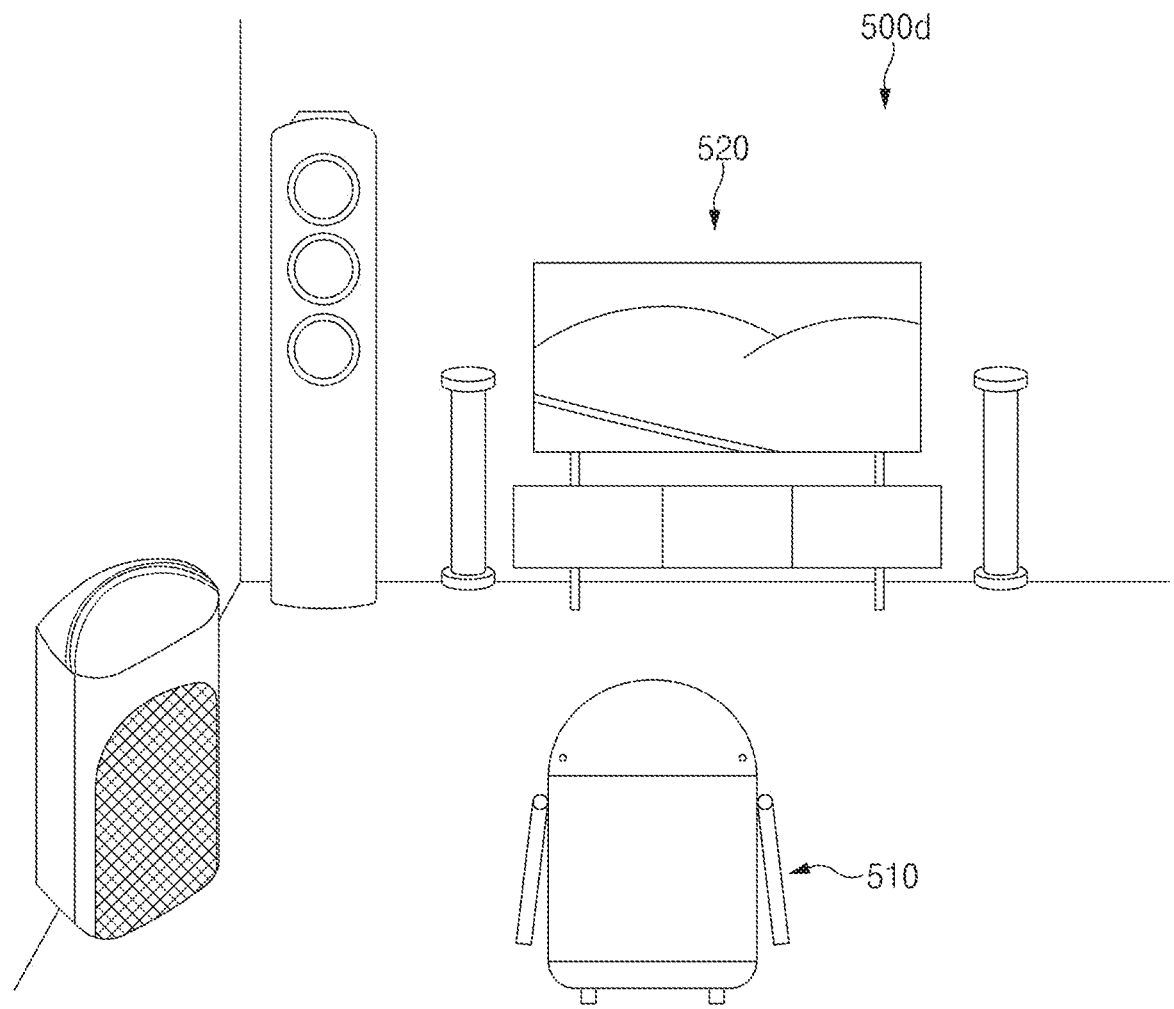
FIG. 5D is a diagram illustrating that an electronic device according to various embodiments of the present invention has transmitted a control command to a TV in response to reception of a user input.

FIG. 5A is a diagram illustrating that an electronic device according to various embodiments of the present invention identifies a TV. FIG. 5B is a diagram illustrating that power of a TV is turned on by a plurality of control commands transmitted from an electronic device according to various embodiments of the present invention to the TV. FIG. 5C is a diagram illustrating that an electronic device according to various embodiments of the present invention moves to a location in which the electronic device is able to transmit a control command to a TV. FIG. 5D is a diagram illustrating that an electronic device according to various embodiments of the present invention has transmitted a control command to a TV in response to reception of a user input.

According to an embodiment, a processor (e.g., the processor 270 of FIG. 2) may control an actuator (e.g., the actuator 210 of FIG. 2) so that an electronic device 510 (e.g., the electronic device 110 of FIG. 1) moves within a specified space (operation 301). The processor 270 may obtain an image and location of an external electronic device (e.g., the external electronic devices 120 to 150 of FIG. 1) through a camera 511 (e.g., the camera 220 of FIG. 2) (operation 303). As illustrated in FIG. 5A, the processor 270 may obtain the image and an location of the external electronic devices 120 to 150 through the camera 511. The processor 270 may identify the external electronic devices 120 to 150 as a TV 520 (e.g., the TV 120 of FIG. 1) on the basis of the obtained image (operation 305). The processor 270 may transmit a plurality of control commands to the identified external electronic devices 120 to 150, i.e., the TV 520 (operation 307). In an embodiment, the processor 270 may transmit the plurality of control commands to the TV 520 via an infrared signal transmitting module 513. The processor 270 may monitor a response of the TV 520 to the plurality of transmitted control commands (operation 309). In an embodiment, the processor 270 may monitor the response of the TV 520 on the basis of an image obtained through the camera 511 or a sound signal obtained through a microphone 512 (e.g., the microphone 250 of FIG. 2). In an embodiment, a control command that causes a pre-specified operation, i.e., an operation of turning on power of the TV 520, among the plurality of control commands, as illustrated in FIG. 5B, may be determined as a first control command (operation 311). The processor 270 may store, in a memory, an identifier of a first control command set in which the first control command is included and the location of the TV 520 (operation 313).

According to an embodiment, the processor 270 may receive, via the microphone 512, a first input which reads "turn on the TV in the living room" (operation 315). The processor 270 may control the actuator 210 to move the electronic device 110 to a location in which a control command is able to be transmitted to the TV 520, as illustrated in FIG. 5C (operation 317). After the electronic device 510 is moved to the location in which a control command is able to be transmitted to the TV 520, the processor 270 may transmit a first control command for turning on power of the TV 520 to the TV 520 via the infrared signal transmitting module 513 (operation 319). The TV 520 located in the living room may perform an operation of turning on the power in response to the first control command transmitted from the electronic device 510, as illustrated in FIG. 5D.

Figure 6A:
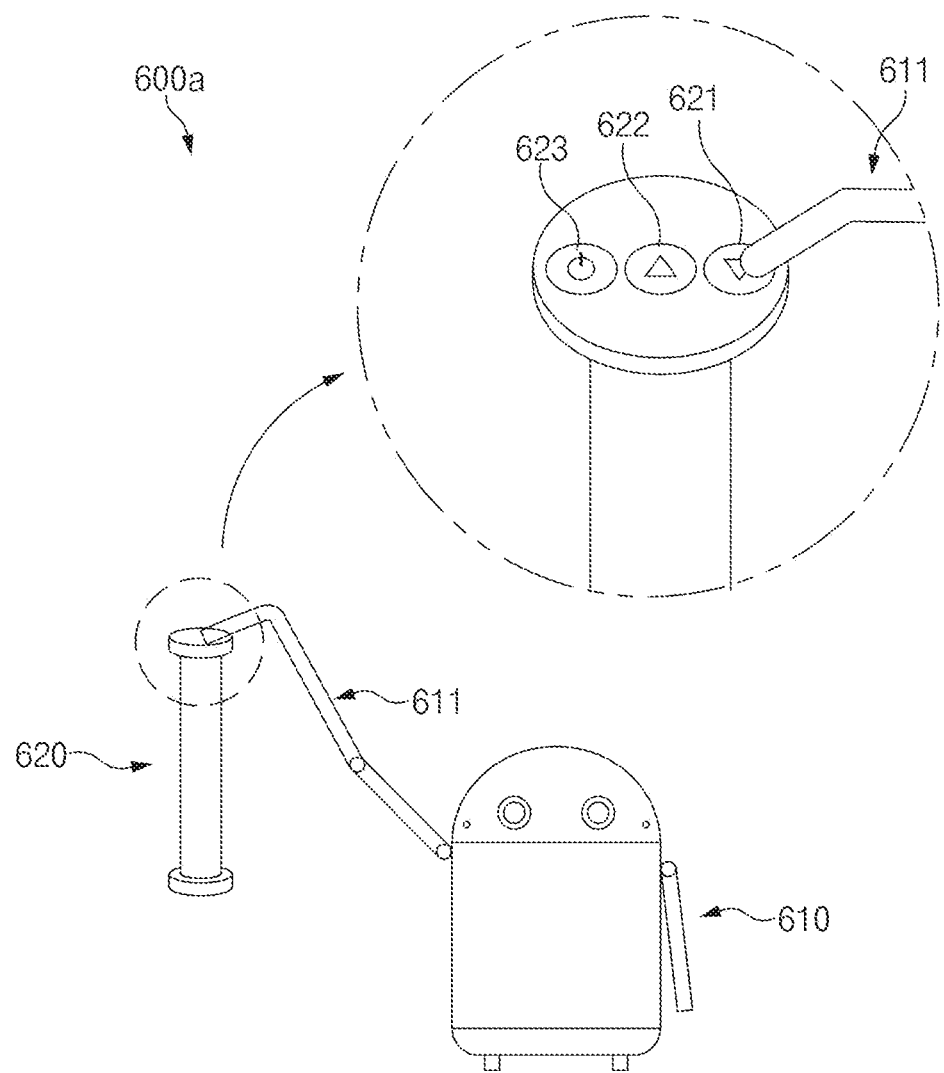
FIG. 6A is a diagram illustrating that an electronic device according to various embodiments of the present invention performs a plurality of control operations on a speaker.
Figure 6B:
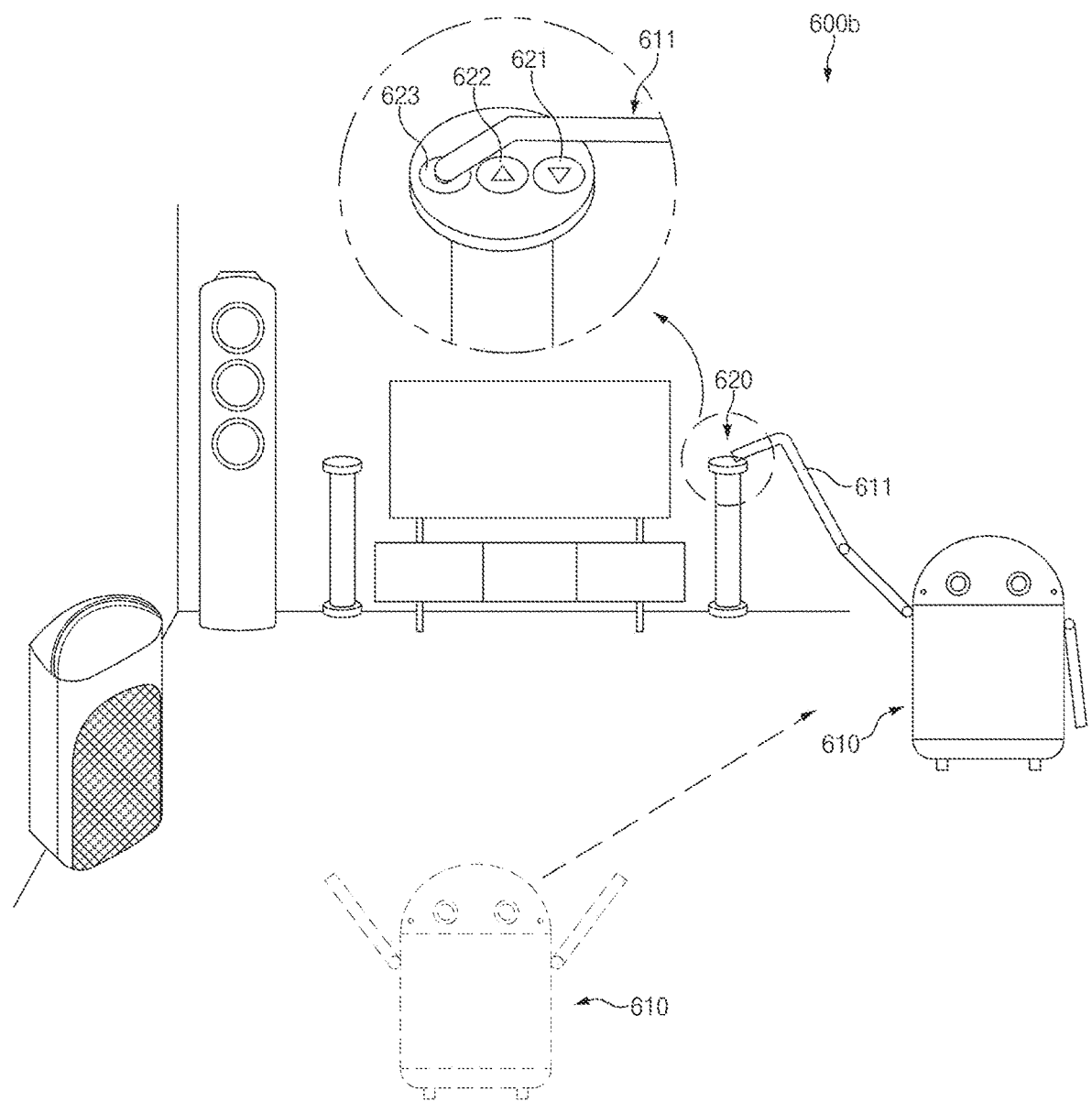
FIG. 6B illustrates that an electronic device according to various embodiments of the present invention performs a control operation after moving to a location in which the electronic device is able to transmit a control command to a speaker.

FIG. 6A is a diagram illustrating that an electronic device according to various embodiments of the present invention performs a plurality of control operations on a speaker. FIG. 6B illustrates that an electronic device according to various embodiments of the present invention performs a control operation after moving to a location in which the electronic device is able to transmit a control command to a speaker.

According to an embodiment, a processor (e.g., the processor 270 of FIG. 2) may control an actuator (e.g., the actuator 210 of FIG. 2) so that an electronic device 610 (e.g., the electronic device 110 of FIG. 1 or the electronic device 510 of FIG. 5) moves (operation 401). The processor 270 may obtain an image and location of an external electronic device (e.g., the external electronic devices 120 to 150 of FIG. 1) through a camera (e.g., the camera 220 of FIG. 2) (operation 403). The processor 270 may identify the external electronic devices 120 to 150 as a speaker 620 (e.g., the speaker 150 of FIG. 1) on the basis of the obtained image (operation 405). The processor 270 may control the actuator 210 to perform a plurality of control operations through buttons 621, 622, and 623 of the speaker 620 (operation 407). For example, as illustrated in FIG. 6A, the processor 270 may control the actuator 210 so that a robot arm 611 (e.g., the robot arm 112 of the electronic device 110 of FIG. 1) sequentially presses a first button 621 (e.g., volume down button), a second button 622 (e.g., volume up button), and a third button 623 (e.g., power button) of the speaker 620. The processor 270 may monitor a response of the speaker 620 to the plurality of performed control operations (operation 409). In an embodiment, the processor 270 may monitor the response of the speaker 620 on the basis of a sound signal obtained through the microphone 250. The processor 270 may store, in a memory (e.g., the memory 260 of FIG. 2), an operation of the speaker 620 corresponding to each control operation and the location of the speaker 620 (operation 411). For example, the processor 270 may store, in the memory 260, information about a volume decrease operation of the speaker 620 corresponding to a control operation of pressing the first button 621, information about a volume increase operation of the speaker 620 corresponding to a control operation of pressing the second button 622, and information about a power on/off operation of the speaker 620 corresponding to a control operation of pressing the third button 623.

According to an embodiment, the processor 270 may receive, via the microphone 250, a first input which reads "turn on the speaker 620 in the living room" (operation 413). The processor 270 may control the actuator 210 to move the electronic device 610 to a location in which a control operation is able to be performed on the speaker 620, as illustrated in FIG. 6B (operation 415). After the electronic device 610 is moved to the location in which a control operation is able to be performed on the speaker 620, the processor 270 may control the actuator 210 so that the robot arm 611 presses the third button 623 to turn on power of the speaker 620 (operation 417).

Figure 7:
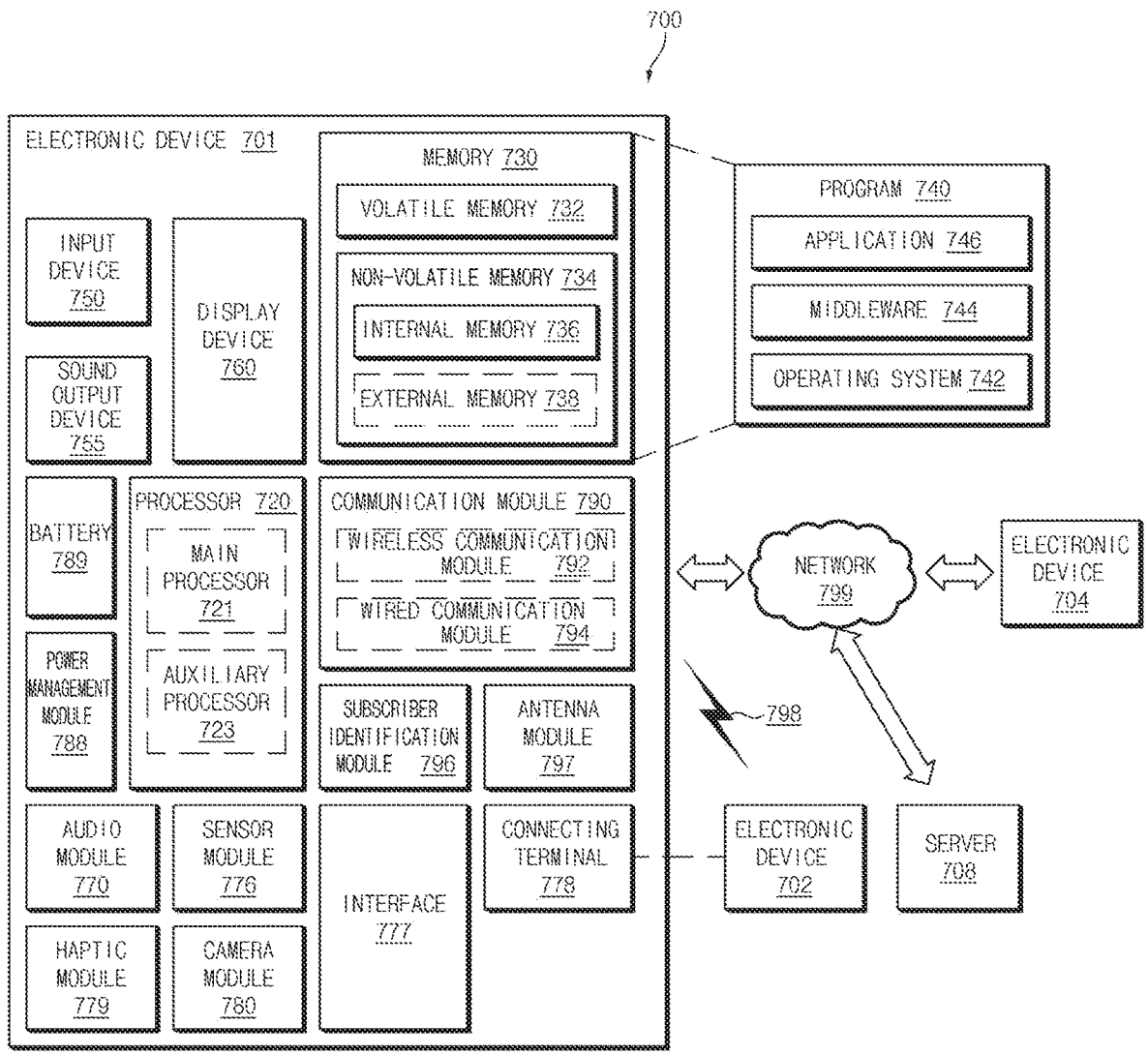
FIG. 7 is a block diagram illustrating an electronic device 701 in a network environment 700 according to various embodiments.

FIG. 7 is a block diagram illustrating an electronic device 701 in a network environment 700 according to various embodiments. Referring to FIG. 7, the electronic device 701 in the network environment 700 may communicate with an electronic device 702 via a first network 798 (e.g., a short-range wireless communication network), or an electronic device 704 or a server 708 via a second network 799 (e.g., a long-range wireless communication network). According to an embodiment, the electronic device 701 may communicate with the electronic device 704 via the server 708. According to an embodiment, the electronic device 701 may include a processor 720, memory 730, an input device 750, a sound output device 755, a display device 760, an audio module 770, a sensor module 776, an interface 777, a haptic module 779, a camera module 780, a power management module 788, a battery 789, a communication module 790, a subscriber identification module (SIM) 796, or an antenna module 797. In some embodiments, at least one (e.g., the display device 760 or the camera module 780) of the components may be omitted from the electronic device 701, or one or more other components may be added in the electronic device 701. In some embodiments, some of the components may be implemented as single integrated circuitry. For example, the sensor module 776 (e.g., a fingerprint sensor, an iris sensor, or an illuminance sensor) may be implemented as embedded in the display device 760 (e.g., a display).

The processor 720 may execute, for example, software (e.g., a program 740) to control at least one other component (e.g., a hardware or software component) of the electronic device 701 coupled with the processor 720, and may perform various data processing or computation. According to one embodiment, as at least part of the data processing or computation, the processor 720 may load a command or data received from another component (e.g., the sensor module 776 or the communication module 790) in volatile memory 732, process the command or the data stored in the volatile memory 732, and store resulting data in non-volatile memory 734. According to an embodiment, the processor 720 may include a main processor 721 (e.g., a central processing unit (CPU) or an application processor (AP)), and an auxiliary processor 723 (e.g., a graphics processing unit (GPU), an image signal processor (ISP), a sensor hub processor, or a communication processor (CP)) that is operable independently from, or in conjunction with, the main processor 721. Additionally or alternatively, the auxiliary processor 723 may be adapted to consume less power than the main processor 721, or to be specific to a specified function. The auxiliary processor 723 may be implemented as separate from, or as part of the main processor 721.

The auxiliary processor 723 may control at least some of functions or states related to at least one component (e.g., the display device 760, the sensor module 776, or the communication module 790) among the components of the electronic device 701, instead of the main processor 721 while the main processor 721 is in an inactive (e.g., sleep) state, or together with the main processor 721 while the main processor 721 is in an active state (e.g., executing an application). According to an embodiment, the auxiliary processor 723 (e.g., an image signal processor or a communication processor) may be implemented as part of another component (e.g., the camera module 780 or the communication module 790) functionally related to the auxiliary processor 723.

The memory 730 may store various data used by at least one component (e.g., the processor 720 or the sensor module 776) of the electronic device 701. The various data may include, for example, software (e.g., the program 740) and input data or output data for a command related thereto. The memory 730 may include the volatile memory 732 or the non-volatile memory 734.

The program 740 may be stored in the memory 730 as software, and may include, for example, an operating system (OS) 742, middleware 744, or an application 746.

The input device 750 may receive a command or data to be used by other component (e.g., the processor 720) of the electronic device 701, from the outside (e.g., a user) of the electronic device 701. The input device 750 may include, for example, a microphone, a mouse, or a keyboard.

The sound output device 755 may output sound signals to the outside of the electronic device 701. The sound output device 755 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 760 may visually provide information to the outside (e.g., a user) of the electronic device 701. The display device 760 may include, for example, a display, a hologram device, or a projector and control circuitry to control a corresponding one of the display, hologram device, and projector. According to an embodiment, the display device 760 may include touch circuitry adapted to detect a touch, or sensor circuitry (e.g., a pressure sensor) adapted to measure the intensity of force incurred by the touch.

The audio module 770 may convert a sound into an electrical signal and vice versa. According to an embodiment, the audio module 770 may obtain the sound via the input device 750, or output the sound via the sound output device 755 or a headphone of an external electronic device (e.g., an electronic device 702) directly (e.g., wiredly) or wirelessly coupled with the electronic device 701.

The sensor module 776 may detect an operational state (e.g., power or temperature) of the electronic device 701 or an environmental state (e.g., a state of a user) external to the electronic device 701, and then generate an electrical signal or data value corresponding to the detected state. According to an embodiment, the sensor module 776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 777 may support one or more specified protocols to be used for the electronic device 701 to be coupled with the external electronic device (e.g., the electronic device 702) directly (e.g., wiredly) or wirelessly. According to an embodiment, the interface 777 may include, for example, a high definition multimedia interface (HDMI), a universal serial bus (USB) interface, a secure digital (SD) card interface, or an audio interface.

A connecting terminal 778 may include a connector via which the electronic device 701 may be physically connected with the external electronic device (e.g., the electronic device 702). According to an embodiment, the connecting terminal 778 may include, for example, a HDMI connector, a USB connector, a SD card connector, or an audio connector (e.g., a headphone connector), The haptic module 779 may convert an electrical signal into a mechanical stimulus (e.g., a vibration or a movement) or electrical stimulus which may be recognized by a user via his tactile sensation or kinesthetic sensation. According to an embodiment, the haptic module 779 may include, for example, a motor, a piezoelectric element, or an electric stimulator.

The camera module 780 may capture a still image or moving images. According to an embodiment, the camera module 780 may include one or more lenses, image sensors, image signal processors, or flashes.

The power management module 788 may manage power supplied to the electronic device 701. According to one embodiment, the power management module 788 may be implemented as at least part of, for example, a power management integrated circuit (PMIC).

The battery 789 may supply power to at least one component of the electronic device 701. According to an embodiment, the battery 789 may include, for example, a primary cell which is not rechargeable, a secondary cell which is rechargeable, or a fuel cell.

The communication module 790 may support establishing a direct (e.g., wired) communication channel or a wireless communication channel between the electronic device 701 and the external electronic device (e.g., the electronic device 702, the electronic device 704, or the server 708) and performing communication via the established communication channel. The communication module 790 may include one or more communication processors that are operable independently from the processor 720 (e.g., the application processor (AP)) and supports a direct (e.g., wired) communication or a wireless communication. According to an embodiment, the communication module 790 may include a wireless communication module 792 (e.g., a cellular communication module, a short-range wireless communication module, or a global navigation satellite system (GNSS) communication module) or a wired communication module 794 (e.g., a local area network (LAN) communication module or a power line communication (PLC) module). A corresponding one of these communication modules may communicate with the external electronic device via the first network 798 (e.g., a short-range communication network, such as Bluetooth™ wireless-fidelity (Wi-Fi) direct, or infrared data association (IrDA)) or the second network 799 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 792 may identify and authenticate the electronic device 701 in a communication network, such as the first network 798 or the second network 799, using subscriber information (e.g., international mobile subscriber identity (IMSI)) stored in the subscriber identification module 796.

The antenna module 797 may transmit or receive a signal or power to or from the outside (e.g., the external electronic device) of the electronic device 701. According to an embodiment, the antenna module 797 may include one or more antennas, and, therefrom, at least one antenna appropriate for a communication scheme used in the communication network, such as the first network 798 or the second network 799, may be selected, for example, by the communication module 790 (e.g., the wireless communication module 792). The signal or the power may then be transmitted or received between the communication module 790 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 701 and the external electronic device 704 via the server 708 coupled with the second network 799. Each of the electronic devices 702 and 704 may be a device of a same type as, or a different type, from the electronic device 701. According to an embodiment, all or some of operations to be executed at the electronic device 701 may be executed at one or more of the external electronic devices 702, 704, or 708. For example, if the electronic device 701 should perform a function or a service automatically, or in response to a request from a user or another device, the electronic device 701, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 701. The electronic device 701 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 740) including one or more instructions that are stored in a storage medium (e.g., internal memory 736 or external memory 738) that is readable by a machine (e.g., the electronic device 701). For example, a processor (e.g., the processor 720) of the machine (e.g., the electronic device 701) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a housing;
an actuator located in the housing;
a camera located in the housing and exposed through a portion of the housing;
a wireless communication circuit located in the housing;
a microphone located in the housing and exposed through a portion of the housing;
at least one processor operatively connected to the actuator, the camera, the wireless communication circuit, and the microphone; and
a memory, which is operatively connected to the at least one processor and stores a plurality of control command sets, the plurality of control command sets comprising a plurality of control commands that cause a plurality of external electronic devices to perform a pre-specified operation, each of the plurality of control command sets correspond to a type of each of the plurality of external electronic devices,
wherein the memory stores instructions that, when executed, cause the processor to:
control the actuator to move the electronic devices,
control the camera to obtain an image and location of a first external electronic device among the plurality of external electronic devices,
identify a first type of the first external electronic device on the basis of the obtained image,
transmit a first plurality of control commands included in the plurality of control command sets corresponding to the first type to the identified first external electronic device via the wireless communication circuit,
monitor a response of the first external electronic device to the first plurality of control commands transmitted,
determine a first control command that has caused the first external electronic device to perform a pre-specified first operation among the first plurality of control commands, based on the monitoring,
store, in the memory, an identifier of a first control command set for the identified first external electronic device and the location of the first external electronic device, wherein the first control command set is a control command set that includes the first control command,
receive, via the microphone or the wireless communication circuit, a first input for instructing the first external electronic device to perform the first operation,
control the actuator to move the electronic device to a location in which the first control command is able to be transmitted to the first external electronic device on the basis of the received first input and the location of the first external electronic device stored in the memory, and
transmit the first control command to the first external electronic device on the basis of the received first input and the identifier of the first control command set for the first external electronic device stored in the memory.

2. The electronic device of claim 1, further comprising:
a simultaneous localization and mapping (SLAM) sensor for obtaining three-dimensional information about a surrounding object,
wherein the memory stores an instruction that causes the at least one processor to identify the first external electronic device further on the basis of the obtained three-dimensional information.

3. The electronic device of claim 1, wherein the memory stores an instruction that causes the at least one processor to include an operation of identifying the first type of the first external electronic device and the location of the first external electronic device in an operation of identifying the first external electronic device.

4. The electronic device of claim 1, wherein the memory stores an instruction that causes the at least one processor to monitor the response of the first external electronic device through at least one of the camera or the microphone.

5. The electronic device of claim 1, further comprising:
a temperature sensor,
wherein the memory stores an instruction that causes the at least one processor to monitor the response of the first external electronic device through the temperature sensor.

6. The electronic device of claim 1, wherein the memory stores an instruction that causes the at least one processor to further store a type of the first external electronic device.

7. The electronic device of claim 1, wherein the first input includes information about the location of the first external electronic device.

8. The electronic device of claim 1, wherein the memory stores an instruction that causes the at least one processor to include, in the pre-specified first operation, at least one of power on, power off, or an operation state change of the first external electronic device.

9. The electronic device of claim 1, wherein the memory stores an instruction that causes the at least one processor to include an infrared signal in a pre-stored wireless signal.

10. The electronic device of claim 1,
wherein the first control command set comprises a second control command that causes the first external electronic device to perform a second operation different from the first operation, and
wherein the memory stores instructions that cause the at least one processor to:
receive, via the microphone or the wireless communication circuit, a second input for instructing the first external electronic device to perform the second operation,
control the actuator to move the first electronic device to a location in which the second control command is able to be transmitted to the first external electronic device on the basis of the received second input and the location of the first external electronic device stored in the memory, and
transmit the second control command to the first external electronic device on the basis of the second received input and the identifier of the first control command set for the first external electronic device stored in the memory.

11. The electronic device of claim 1, wherein the identifier is mapped to the identified first external electronic device.

12. A method for an electronic device to control a plurality of external electronic devices, the method comprising:
storing in a memory a plurality of control command sets, wherein the plurality of control command sets comprises a plurality of control commands which cause the plurality of external electronic devices to perform a pre-specified first operation, and each of the plurality of control command sets correspond to a type of each of the plurality of external electronic devices;
controlling an actuator to move the electronic device;
controlling a camera to obtain an image and location of a first external electronic device among the plurality of external electronic devices;
identifying a first type of the first external electronic device on the basis of the obtained image;
transmitting a first plurality of control commands included in a plurality of control command sets corresponding to the first type to the identified first external electronic device;
monitoring a response of the first external electronic device to the plurality of control commands transmitted;
determining a first control command that has caused the first external electronic device to perform a pre-specified first operation among the first plurality of control commands, based on the monitoring;
storing an identifier of a first control command set for the identified first external electronic device and the location of the first external electronic device, wherein the first control command set is a control command set that includes the first control command;
receiving, via a microphone or a wireless communication circuit, a first input for instructing the first external electronic device to perform the first operation;
controlling the actuator to move the electronic device to a location in which the first control command is able to be transmitted to the first external electronic device on the basis of the received first input and the stored location of the first external electronic device; and
transmitting the first control command to the first external electronic device on the basis of the received first input and the identifier of the first control command set for the first external electronic device stored in a memory.

13. The method of claim 12, wherein the identifying of the first external electronic device comprises identifying the first type of the first external electronic device and the location of the external electronic device.

14. The method of claim 12, wherein the monitoring of the response of the first external electronic device comprises monitoring the response of the first external electronic device through at least one of the camera or the microphone.

15. The method of claim 12, further comprising:
storing a type of the first external electronic device.

16. The method of claim 12,
wherein the first control command set comprises a second control command that causes the first external electronic device to perform a second operation different from the first operation, and
wherein the method further comprises:
receiving, via the microphone or the wireless communication circuit, a second input for instructing the first external electronic device to perform the second operation,
controlling the actuator to move the electronic device to a location in which the second control command is able to be transmitted to the first external electronic device on the basis of the received second input and the stored location of the first external electronic device, and
transmitting the second control command to the first external electronic device on the basis of the second received input and the stored identifier of the first control command set for the first external electronic device.

* * * * *